Patented Nov. 5, 1935

2,019,883

UNITED STATES PATENT OFFICE 2,019,883

DEHYDROGENATION OF HYDROGENATED HETEROCYCLIC COMPOUNDS

Carl Wulff and Wilhelm Breuers, Ludwigshafen-on-the-Rhine, Germany, assignors to I. G. Farbenindustrie Aktiengesellschaft, Frankfort-on-the-Main, Germany No Drawing. Application October 31, 1932, Serial No. 640,571. In Germany November 13, 1931

16 Claims. (Cl. 260—40)

The present invention relates to the dehydrogenation of hydrogenated heterocyclic compounds.

It has already been proposed to dehydrogenate hydrogenated heterocyclic compounds by treatment with substances supplying oxygen, such as lead oxide. Hydrogenated heterocyclic compounds have also been catalytically dehydrogenated in the presence of metals of the platinum group or manganese oxide. These methods are attended by disadvantages, however. The dehydrogenation by means of lead oxide cannot be carried out continuously because the activity of the lead oxide is exhausted when it has given off the maximum possible amount of oxygen. Moreover, lead oxide does not act until at comparatively high temperatures, for example from 500° to 750° C. The catalytic dehydrogenation by means of manganese oxide also does not take place until temperatures of about 600° C., whereby undesirable side reactions become markedly noticeable. Thus for example by leading piperidine over manganese oxide at 600° C. it is certainly dehydrogenated but the reaction does not cease with pyridine but proceeds to the formation of considerable amounts of dipyridyl with the splitting off of further hydrogen. The said disadvantages are avoided by employing platinum metals which have a very good activity even at low temperatures, but these are extremely sensitive to poisoning for example by sulphur or halogen, so that their activity subsides after a short time. Piperidine and hydrogenated quinolines have been already catalytically dehydrogenated with the aid of nickel; even if a dehydrogenation of piperidine to pyridine can be attained in this manner, the dehydrogenation of tetrahydroquinone for example leads mainly to skatole and very small quantities of quinoline.

We have now found that hydrogenated heterocyclic compounds can be very advantageously dehydrogenated catalytically by carrying out the dehydrogenation in the presence of catalysts essentially containing heavy metals of the left sub-group of the 6th group of the periodic system or, preferably, compounds thereof as are stable under the conditions of working, as for example oxides, sulphides, selenides, such as the oxides of chromium, molybdenum, tungsten and uranium, molybdic acid ($H_2MoO_4$ and $MoO_3,2H_2O$), tungstic oxide ($WO_3$), the sulphides of chromium, molybdenum and tunsten, and molybdenum and tungsten selenides. Compounds of the said metals which are volatile at the temperatures of working cannot be employed of course, whereas those which are decomposed with the formation of the metals or heat-resistant compounds thereof may find useful application, though it is simple to directly employ the metals or their stable compounds. Mixtures of the said metals or of their compounds with each other or with other substances, as for example heat-resistant activators and stabilizers, such as zinc, copper, cobalt, nickel, iron, calcium, barium or magnesium or heat-resistant compounds thereof, such as oxides, sulphides or carbonates, are also suitable as catalysts. Suitable catalysts are for example molybdic acid, tungstic oxide, uranium oxide, tungsten sulphide, mixtures of zinc oxide, calcium oxide and tungstic oxide; copper chromite and barium oxide, zinc oxide, magnesium oxide and molybdic acid; molybdic acid and nickel, and the like. Particularly efficient catalysts are tunsten sulphide and mixtures from zinc oxide, magnesium oxide and molybdic acid in which the single components may be present in the molecular proportions of from about 1:1:1 to about 1:5:2. In many cases it is advantageous to employ the catalysts deposited on carriers, such as bleaching earths or active carbon. The activity of the catalysts may often be considerably improved by treating them before employment with hydrogen or gases supplying hydrogen, as for example hydrogen sulphide or with ammonia, steam or nitrogen at elevated temperatures, such as from 300° to 500° C.

Hydrogenated heterocyclic compounds which may be dehydrogenated according to the present invention are for example the nitrogen-bearing piperidine, the isomeric pipecolines (mono-alkyl piperidines), such as α, β and γ pipecolines, the isomeric lutetidines (di-alkyl piperidines), tetra- and deca-hydroquinolines including bz- and py-tetra-hydroquinolines, the tetra-and deca-hydroquinaldines, such as tetra- and deca-quinaldine and γ-lepidine, the hydrogenated anthrapyridines, such as α-anthrapyridine, α- or β-benzoquinolines and isomeric benzoquinaldines containing the nuclei

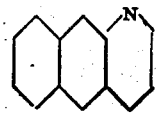

and

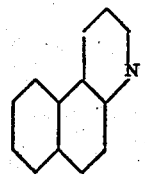

Further nitrogen-bearing hydrogenated heterocyclic compounds are for example hydrogenated carbazols (obtainable by condensing phenyl-hydrazine with cyclohexanone or its homologues), and indols. Oxygen-bearing hydrogenated heterocyclic compounds are for example diphenylene oxide and its homologues and furanes. The said compounds should not contain acid substituents, such as halogen, carboxylic or sulphonic acid radicals or nitro groups.

The process according to this invention may be carried out for example by leading the hydrogenated heterocyclic compounds to be dehydrogenated over the catalysts at temperatures of from about 250° to about 550° C., preferably from about 300° to about 500° C. Inert gaseous diluents, that is gases or vapors which do not take part in the reaction, such as hydrogen, nitrogen, or steam, or mixtures thereof, may be added at the same time for preventing a condensation. The gases or vapors may also serve as heat transferrers and in some cases they may also prevent by-reactions by condensation as can be avoided for example by the presence of hydrogen. The process may be carried out at atmospheric, reduced or slightly increased pressure, as for example at about 200 millimetres of mercury or at 5, 10, 20, 40 or 60 atmospheres. When employing the said catalysts, the dehydrogenation generally speaking proceeds with very good yields and without any appreciable formation of by-products.

The following examples will further illustrate how this invention may be carried out in practice, but the invention is not restricted to these examples. The parts are by weight if not otherwise stated.

Example 1

A mixture of 5.6- and 6.7-tetramethylenequinolines (obtained by the Skraup synthesis from ar-tetrahydro-beta-napthylamine and glycerine) are led together with hydrogen in such proportions that for each 100 grams of vapor of the compounds to be dehydrogenated there are about 50 litres of hydrogen, through a porcelain tube heated to about 400° C. and charged with pure molybdic acid. The resulting reaction product is a mixture consisting substantially of benzoquinoline and alpha-anthrapyridine and containing practically no decomposition products but about 10 per cent of non-dehydrogenated initial material. Instead of hydrogen, about the same amount of steam may be added, in this case it is preferable to work at about 450° C.

When employing hydrogen, the catalyst is preferably treated with hydrogen for several hours at 400° C. before use.

Example 2

Piperidine is led at 410° C. over pure tungstic oxide in the presence of hydrogen. With a through-put of 10 cubic centimeters of piperidine and 40 litres of hydrogen per 100 grams of catalyst per hour, a reaction product is obtained which consists to the extent of 74 per cent of pyridine and only contains about 10 per cent of condensation products.

Example 3

Vapors of 1.2.3.4-tetrahydroquinoline in admixture with hydrogen are led at 410° C. over a catalyst consisting of equimolecular proportions of zinc oxide, magnesium oxide and molybdic acid, the speed being such that 11 cubic centimeters of liquid 1.2.3.4-tetrahydroquinoline are passed, per hour, over each 100 cubic centimeters of the catalyst. Pure colorless quinoline is obtained in a quantitative yield. The catalyst employed is treated with hydrogen for 10 hours at about 400° C. before use.

Example 4

Tetrahydro-alpha-benzoquinoline (obtained by the Skraup synthesis from ar-tetrahydro-alpha-naphthylamine and glycerine) is led together with hydrogen at 500° C. over a catalyst consisting of 1 molecular proportion of zinc oxide, 2 molecular proportions of magnesium oxide and 1 molecular proportion of molybdic acid. With a through-put of 30 grams of tetrahydro-alpha-benzoquinoline per hour and 20 litres of hydrogen per 500 cubic centimeters of catalyst, pure alpha-benzoquinoline is obtained in a quantitative yield. The catalyst employed is treated with hydrogen for about 10 hours at 400° C. before use.

Example 5

10 grams of py-tetrahydro-quinoline together with 10 litres of nitrogen are led at 400° C. over each 100 cubic centimeters of a catalyst consisting of tungsten sulphide. During the first 3 hours a continuously decreasing quantity of hydrogen sulphide is formed in addition to quinoline as reaction product. By pretreating the catalyst with ammonia or more suitably with hydrogen for several hours at about 400° C., quinoline only is obtained as the reaction product in a quantitative yield. Metallic tungsten may also be employed as the catalyst instead of tungsten sulphide; under the same conditions 80 per cent of initial py-tetrahydro-quinoline is then converted into quinoline by dehydrogenation without any by-reaction. Tungsten sulphide may also be employed deposited on carriers such as Florida earth or active charcoal.

Example 6

100 parts of a liquid mixture consisting of deca- and tetrahydro-quinoline (density=0.945 at 22° C.) are heated to 400° C. in a rotary autoclave together with 30 parts of a catalyst consisting of 1 molecular proportion of zinc oxide, 5 molecular proportions of magnesium oxide and 2 molecular proportions of molybdic acid which has been previously subjected to a treatment with hydrogen at 400° C. After about 3 hours, the pressure in the autoclave rises to 25 atmospheres. The autoclave is then cooled down to room temperature and the hydrogen formed is allowed to escape. After further heating twice to 400° C., whereby a pressure of from 30 to 40 atmospheres is attained by the splitting off of hydrogen, and cooling to room temperature, a product is obtained the density of which is 0.979 and the hydrogen content of which is reduced to 9.5 per cent in comparison to 11.5 per cent of the initial material. Under the said conditions of working, a slight splitting off of ammonia occurs simultaneously with the dehydrogenation.

Example 7

5 grams of tetrahydrodiphenylene oxide (obtainable according to Ebel, Helvetica Chimica Acta, 1929, 12, page 11, from chlorcyclohexanone and sodium phenolate) are led together with 10 litres of nitrogen at about 450° C., over each 100 cubic centimeters of a catalyst consisting of 1 molecular proportion each of zinc oxide, magnesium oxide and molybdic acid, which has been pretreated to 400° C. in the presence of hydrogen. Crude diphenylene oxide is obtained in a good yield as a yellowish crystalline powder. After recrystallization in ethyl alcohol, colorless crystals having a melting point of 81° C. are obtained.

Example 8

Tetrahydrocarbazol, obtainable from phenylhydrazine and cyclohexanone, is passed at about 400° C. over a catalyst consisting of 8 parts of copper oxide, 9 parts of chromium oxide and 2 parts of barium oxide deposited on 38 parts of Florida earth, at a velocity of vapors from about 50 grams of tetrahydrocarbazol per hour and per liter of the catalyst together with 75 liters of hydrogen. Pure carbazol is obtained in a good yield of about 95 per cent after recrystallization of the product in ethyl alcohol.

What we claim is:—

1. In a catalytic dehydrogenation of hydrogenated heterocyclic compounds by contacting the said compounds with a dehydrogenation catalyst, while heating, the step which comprises the employment of a catalyst essentially comprising a substance selected from the group consisting of heavy metals of the left subgroup of the 6th group of the periodic system of Mendelejeff and heat resistant compounds thereof.

2. In the catalytic dehydrogenation of hydrogenated heterocyclic compounds by contacting the said compounds with a dehydrogenation catalyst, while heating to a temperature between about 250° and about 550° C., the step which comprises the employment of a catalyst essentially comprising a substance selected from the group consisting of heavy metals of the left subgroup of the 6th group of the periodic system of Mendelejeff and heat resistant compounds thereof.

3. In the catalytic dehydrogenation of hydrogenated heterocyclic compounds by contacting the said compounds with a dehydrogenation catalyst, while heating, to a temperature between about 250° and about 550° C., the step which comprises the employment of a catalyst essentially comprising a substance selected from the group consisting of heavy metals of the left subgroup of the 6th group of the periodic system of Mendelejeff and heat resistant compounds thereof which has been pretreated at from 300° to 500° C. with a hydrogen-bearing gas.

4. In the catalytic dehydrogenation of hydrogenated heterocyclic compounds by contacting the said compounds with a dehydrogenation catalyst, while heating to a temperature between about 250° and about 550° C., the step which comprises the employment of a catalyst essentially comprising an oxidic compound of a heavy metal of the left subgroup of the 6th group of the periodic system of Mendelejeff.

5. In the catalytic dehydrogenation of hydrogenated heterocyclic compounds by contacting vapors of the said compounds with a dehydrogenation catalyst while heating, the step which comprises the employment of a catalyst essentially comprising an oxidic compound of a heavy metal of the left subgroup of the 6th group of the periodic system of Mendelejeff and the oxide of a solid, base, bivalent metal.

6. In the catalytic dehydrogenation of hydrogenated heterocyclic compounds by contacting the said compounds with a dehydrogenation catalyst while heating to a temperature between about 250° and about 550° C., the step which comprises the employment of a catalyst essentially comprising molybdic acid.

7. In the catalytic dehydrogenation of hydrogenated heterocyclic compounds by contacting the said compounds with a dehydrogenation catalyst while heating to a temperature between about 250° and about 550° C., the step which comprises the employment of a catalyst essentially comprising molybdic acid and the oxide of a solid, base, bivalent metal.

8. In the catalytic dehydrogenation of hydrogenated heterocyclic compounds by contacting the said compounds with a dehydrogenation catalyst while heating to a temperature between about 250° and about 550° C., the step which comprises the employment of a catalyst essentially comprising molybdic acid and zinc oxide.

9. In the catalytic dehydrogenation of hydrogenated heterocyclic compounds by contacting the said compounds with a dehydrogenation catalyst while heating to a temperature between about 250° and about 550° C., the step which comprises the employment of a catalyst essentially comprising molybdic acid, zinc oxide and magnesium oxide.

10. In the catalytic dehydrogenation of hydrogenated heterocyclic compounds by contacting the said compounds with a dehydrogenation catalyst while heating to a temperature between about 250° and about 550° C., the step which comprises the employment of a catalyst essentially comprising tungsten sulphide.

11. The process for the catalytic dehydrogenation of hydrogenated heterocyclic compounds which comprises contacting a polynuclear nitrogeneous hydrogenated heterocyclic compound while heating to from about 300° to about 400° C. with a catalyst essentially comprising a substance selected from the group consisting of heavy metals of the left subgroup of the 6th group of the periodic system of Mendelejeff and heat resistant compounds thereof.

12. The process for the catalytic dehydrogenation of hydrogenated heterocyclic compounds which comprises contacting a hydrogenated benzoquinoline while heating to from about 300° to about 400° C. with a catalyst essentially comprising a substance selected from the group consisting of heavy metals of the left subgroup of the 6th group of the periodic system of Mendelejeff and heat resistant compounds thereof.

13. The process for the catalytic dehydrogenation of hydrogenated heterocyclic compounds which comprises contacting a hydrogenated anthrapyridine while heating to from about 300° to about 400° C. with a catalyst essentially comprising a substance selected from the group consisting of heavy metals of the left subgroup of the 6th group of the periodic system of Mendelejeff and heat resistant compounds thereof.

14. The process for the catalytic dehydrogenation of hydrogenated heterocyclic compounds which comprises contacting a tetrahydrocarbazol while heating to from about 300° to about 400° C. with a catalyst essentially comprising a substance selected from the group consisting of heavy metals of the left subgroup of the 6th group of the periodic system of Mendelejeff and heat resistant compounds thereof.

15. The process for the catalytic dehydrogenation of hydrogenated heterocyclic compounds which comprises contacting a hydrogenated benzoquinoline while heating to from about 300° to about 400° C. with a catalyst essentially comprising molybdic acid, zinc oxide and magnesium oxide.

16. The process for the catalytic dehydrogenation of hydrogenated heterocyclic compounds which comprises contacting a hydrogenated anthrapyridine while heating to from about 300° to about 400° C. with a catalyst essentially comprising tungsten sulphide.

CARL WULFF.
WILHELM BREUERS.

CERTIFICATE OF CORRECTION.

Patent No. 2,019,883.  November 5, 1935.

CARL WULFF, ET AL.

It is hereby certified that error appears in the printed specification of the above numbered patent requiring correction as follows: Page 1, first column, line 37, for "tetrahydroquinone" read tetrahydroquinoline; and that the said Letters Patent should be read with this correction therein that the same may conform to the record of the case in the Patent Office.

Signed and sealed this 3rd day of March, A. D. 1936.

Leslie Frazer
Acting Commissioner of Patents.

(Seal)